March 4, 1952  R. A. DAALMEYER  2,587,973
AUTOMATIC TIRE TUBE AIR VALVE
Filed Sept. 19, 1949
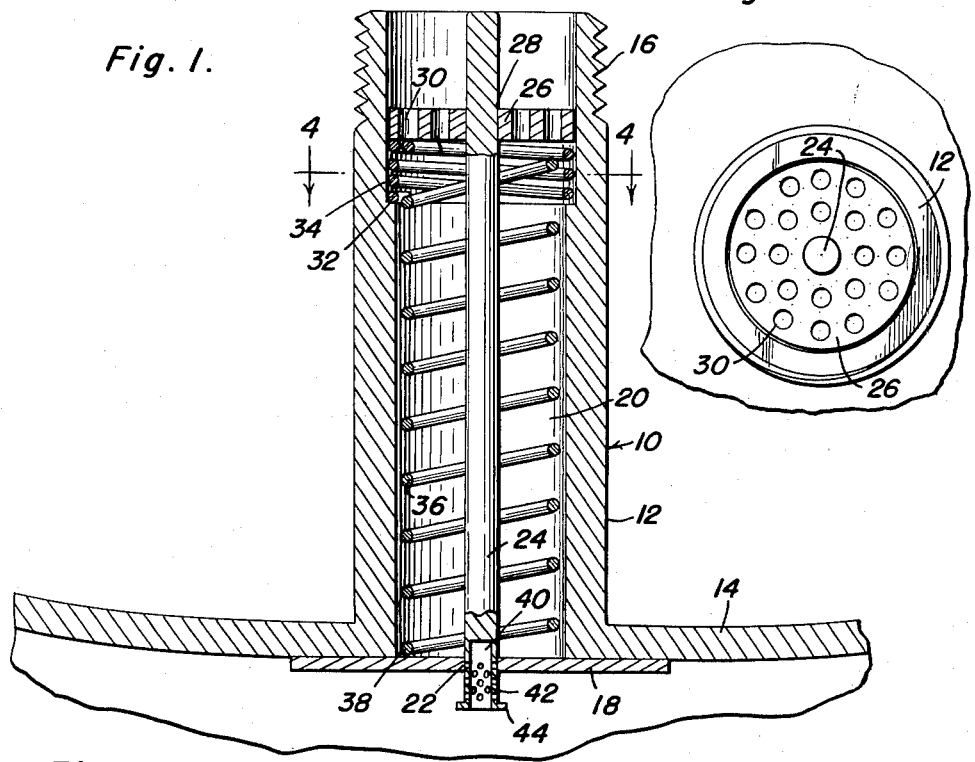
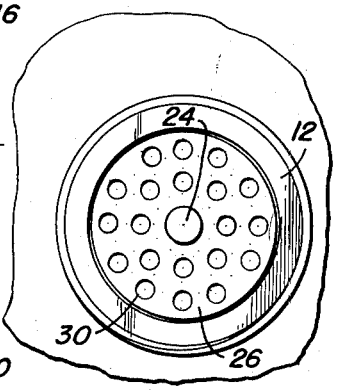
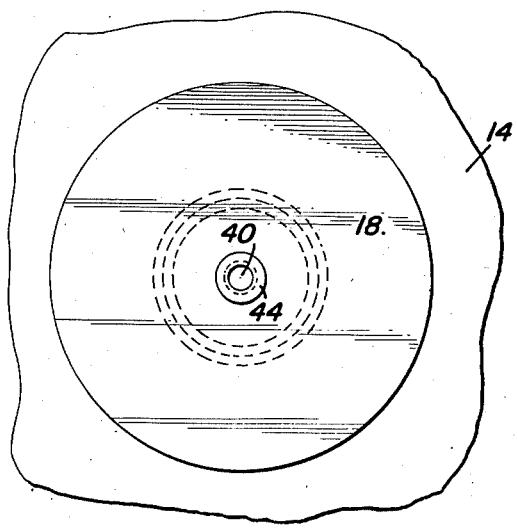
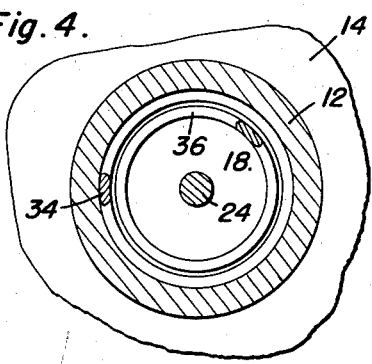
Robert A. Daalmeyer
INVENTOR.
BY Patented Mar. 4, 1952

2,587,973

UNITED STATES PATENT OFFICE 2,587,973

AUTOMATIC TIRE TUBE AIR VALVE

Robert A. Daalmeyer, Hoboken, N. J.

Application September 19, 1949, Serial No. 116,550

3 Claims. (Cl. 137—53)

This invention relates to pneumatic air valves and has for its main object to automatically retain a tire under the correct rated air pressure.

Another important object of this invention is to permit the escape of air from a tire tube, when the internal pressure becomes greater than the fixed pressure for the tube, caused by hot weather conditions.

Another important object of this invention is to provide a sturdy and compact pneumatic tire valve, which will enable air to be put into an inner tube and which will automatically release the internal pressure, in the event the air pressure within the tube is greater than the tube capacity.

Another important object of this invention is to provide a valve, having the above objects, which can be calibrated for various tube capacities.

These and ancillary objects and structural features of merit are attained by this invention, the preferred embodiment of which is set forth in the following description and illustrated in the accompanying drawings, wherein:

Figure 1 is a central vertical section through the improved valve mechanism;

Figure 2 is a top plan view;

Figure 3 is a bottom plan view, and,

Figure 4 is a transverse sectional view taken on line 4—4 of Figure 1.

In the accompanying drawings, the improved valve mechanism 10 includes a cylindrically tubular valve housing 12 which is formed integral at its lower end with an inner tube 14. Of course, the lower end of the valve housing may be formed with a plate, which can be inserted through a suitable opening in the wall of an inner tube and secured tightly therein in any desired manner. The upper exterior end of the housing is threaded as at 16 to receive a conventional cap.

A valve plate 18 is provided and is adapted to close off the axial passage 20 in the housing, the valve plate being formed with a center opening 22 to receive the lower end of an elongated valve stem 24. The plate is slidably mounted concentric to the lower end of the valve stem. The valve stem extends longitudinally through the passage 20 and an annular disk or plate 26 is welded as at 28 or otherwise secured concentric on the upper end of the stem. The disk 26 is formed with a plurality of circumferentially spaced radially extending vertical openings or apertures 30, for a purpose to be described. An annular shoulder 32 is formed in the upper portion of the passage and a spring 34 is seated at its lower end thereon, the upper end of the spring bearing against the disk 26. A main spring 36 is welded as at 38 to the upper face of valve plate 18 and is concentrically spiralled around the valve stem 24, the spring being disposed concentric within the spring 34 and welded or otherwise secured at its upper end to the disk 26 for yieldingly engaging said plate with the tube 14.

The lower end of the valve stem 24 is formed with an axial opening or bore 40, the side walls being provided with a plurality of transverse openings 42. A laterally extending annular flange or shoulder 44 is formed on the lower end of the valve stem to prevent withdrawal of the stem through the center opening 22 in the valve plate 18.

In operation, the cap in a conventional air hose nozzle depresses the stem 24 and compresses the springs 34 and 36 to push the valve plate 18 away from the housing. Air, under pressure, passes through the openings 30 in the disk and enters the inner tube through the opening created by the downward movement of the valve plate. If the internal pressure corresponds to the rated pressure of the particular tube, after release of outside pressure, the valve mechanism remains in a normal position, as illustrated in Figure 1. However, if the internal pressure is greater than the rated pressure, the pressure from the tube will force the stem upwardly by acting on the flange 44 and the bore 40 and the pressure will be released by means of the openings 42 communicated with the passage 20 and the openings 30 in the disk.

Thus, it can be seen that a simple and sturdy valve mechanism is provided, whereby the internal pressure of the inner tube will be automatically controlled.

Having described the invention, what is claimed as new is:

1. A valve mechanism for a pneumatic tire comprising a tubular housing extending outwardly from an inner tube, a valve plate transversely positioned at the inner end of the housing, a rod slidably disposed through the valve plate and extending through the housing, a disk secured on the outer end portion of the rod and within said housing, said disk having a plurality of transverse openings therein, means actuated by the inward movement of the disk for opening the valve plate and means for automatically exhausting excess internal pressure from the tube, wherein said last means includes an axial bore formed in the inner end of the rod, lateral exhaust ports in said rod communicating with the bore, an annular shoulder formed in the bore of the housing adjacent the outer end, a spring disposed about said valve opening means and said rod and mounted between the shoulder and disk and stop means formed on the inner end of the rod.

2. A valve mechanism for a pneumatic tire comprising a tubular housing extending outwardly from an inner tube, a valve plate transversely positioned at the inner end of the housing, a rod slidably disposed through the valve plate and extending through the housing, a disk secured on the outer end portion of the rod and within said housing, said disk having a plurality of transverse openings therein, means actuated by the inward movement of the disk for opening the valve plate and means for automatically exhausting excess internal pressure from the tube, wherein said last means includes an axial bore formed in the inner end of the rod, lateral exhaust ports in said rod communicating with the bore, an annular shoulder formed in the bore of the housing adjacent the outer end, a spring disposed about said valve opening means and said rod and mounted between the shoulder and disk and stop means formed on the inner end of the rod, wherein said stop means includes a lateral flange formed on the inner end of the rod.

3. A valve mechanism comprising a tubular housing having an axial passage therein, a valve plate adapted to close off the inner end of the passage, a rod slidably disposed through the plate and extending longitudinally in the passage, a vertically apertured disk fixed on the outer end of the rod, a spring secured to the disk and to the plate and disposed concentrically about the rod, whereby downward movement of the rod compresses the spring to open the valve plate, an annular shoulder formed in the outer end of the passage, a spring disposed between the shoulder and disk, an axial opening formed in the inner end of the rod, lateral exhaust ports in said rod end communicating with the passage and stop means formed on the extremity of the inner end.

ROBERT A. DAALMEYER.

REFERENCES CITED

The following references are of record in the file of this patent:

UNITED STATES PATENTS

| Number | Name | Date |
|---|---|---|
| 903,841 | Cohn | Nov. 17, 1908 |
| 1,563,847 | Hall | Dec. 1, 1925 |
| 2,254,655 | Hollowell | Sept. 2, 1941 |
| 2,323,237 | Payne | June 29, 1943 |

FOREIGN PATENTS

| Number | Country | Date |
|---|---|---|
| 7,230 | Great Britain | of 1911 |